May 30, 1950  G. M. ANDERSON  2,509,328
TIRE TUBE HOLDER
Filed Jan. 21, 1948  2 Sheets-Sheet 2
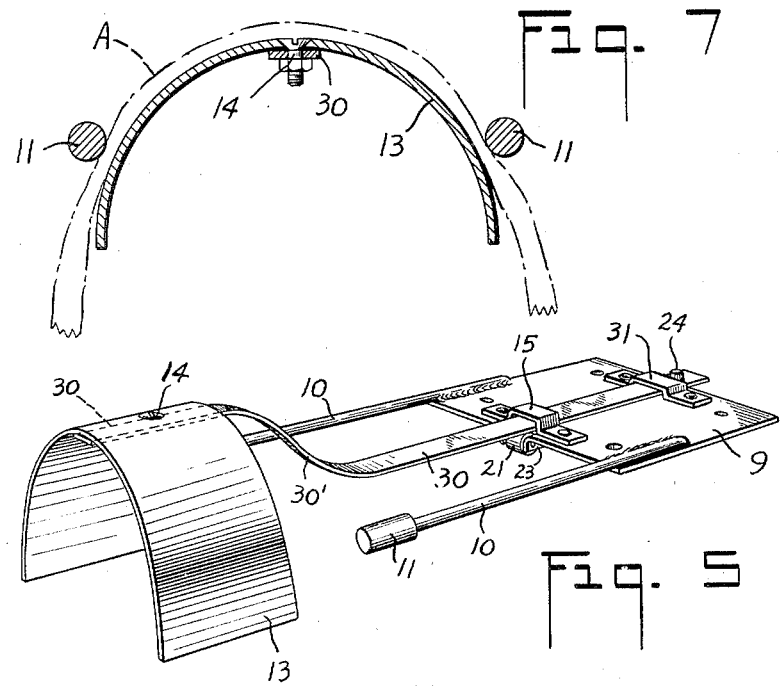
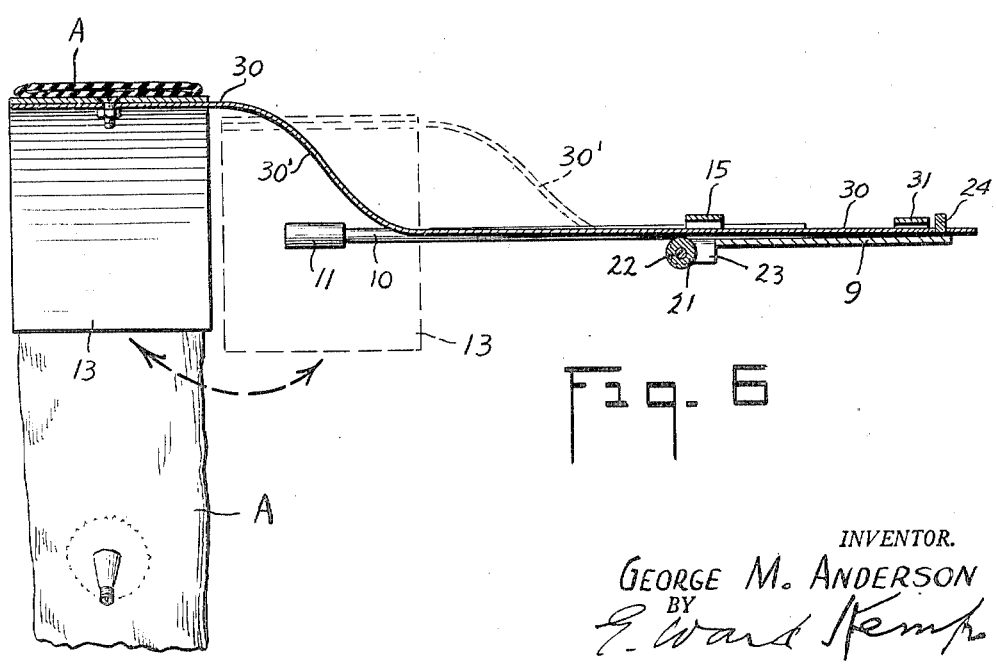
INVENTOR.
GEORGE M. ANDERSON
BY
ATTORNEY Patented May 30, 1950

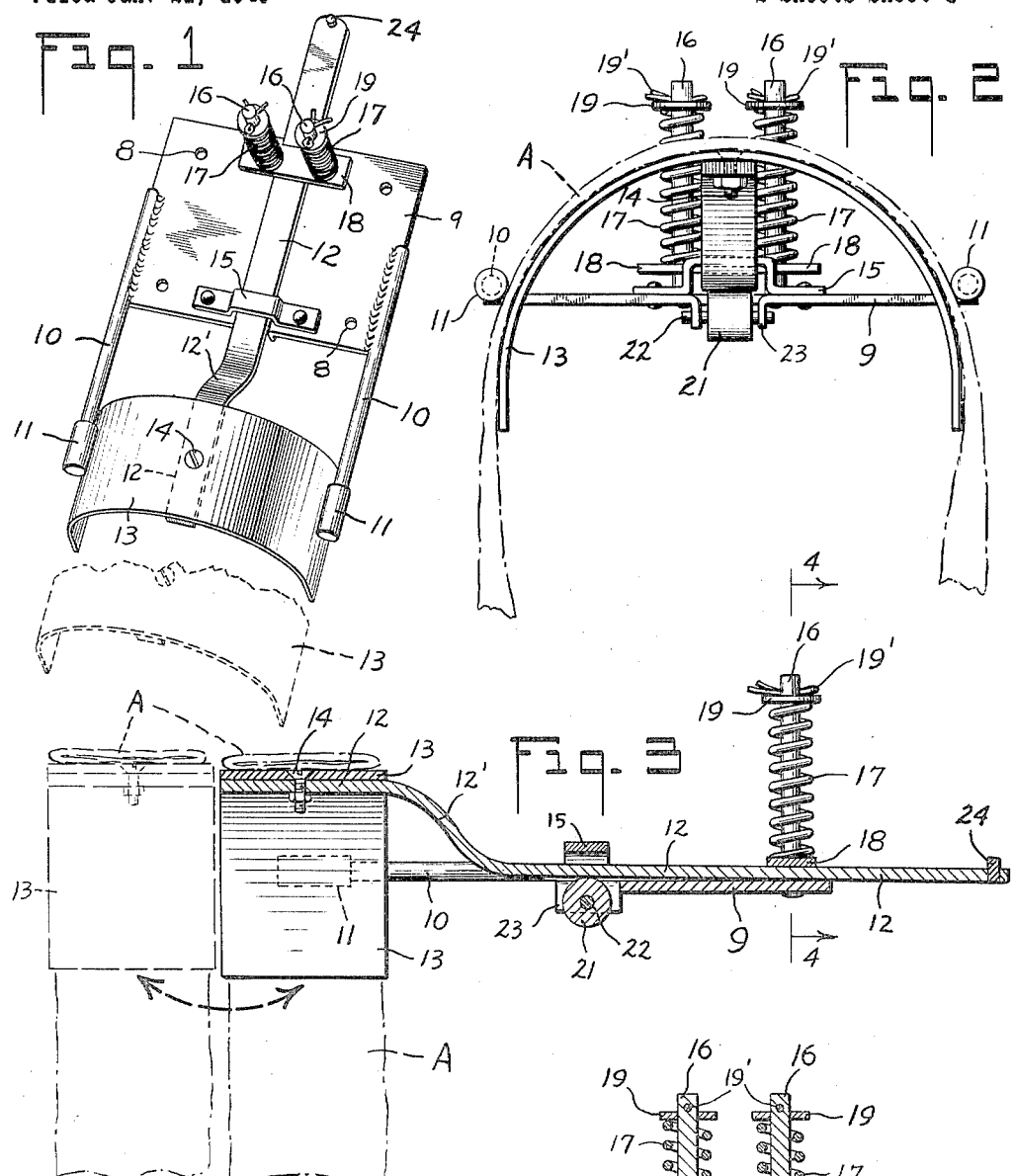

2,509,328

UNITED STATES PATENT OFFICE 2,509,328

TIRE TUBE HOLDER

George M. Anderson, Duvall, Wash.

Application January 21, 1948, Serial No. 3,472

4 Claims. (Cl. 81—15.2)

This invention relates to devices for holding rubber inner tubes from automobile tires for convenience in repairing them.

In the practice of repairing inner tubes, it is important to provide some holding means which may be readily adapted for use with work benches of various elevations and locations, and which will occupy little space in work shops or transportation, and which may be manufactured economically for general use, and that may be operated by one hand.

It is therefore an object of this invention to provide a device which will meet each and all of the needs and requirements above stated, and another object is to provide improvements over structure described in Letters Patent of the United States, numbered 2,384,803 issued to me September 18, 1945, for holding tire tubes; and a particular object is to provide a device which may be used in connection with various shops or places of business, provided with a convexed shaped mandrel for supporting a tube to be repaired, and a bar adjustably mounted for supporting the mandrel at various elevations and in varying distances longitudinally for adjustments.

With these and other objects to be hereinafter stated, I have illustratively exemplified by invention by the accompanying drawings, of which:

Figure 1 is a perspective top view of my preferred form, in full lines and dotted lines indicating a position of the mandrel when drawn forward. Figure 2 shows a front elevation enlarged, with a tube draped over the mandrel. Figure 3 is a longitudinal cross section view enlarged, also showing a forward position of the mandrel in dotted lines, and Figure 4 is a cross section view enlarged taken on lines 4—4 from Fig. 3.

Figure 5 is a perspective view of my alternate structure wherein the supporting bar is inherently resilient for normally supporting the mandrel upward between the side arms, Figure 6 is a cross section view enlarged taken across the center longitudinally of Fig. 5; and Figure 7 is an enlarged cross section view of the mandrel taken from the front along the center thereof, with the side fingers in position over a tube draped above the mandrel.

Like characters on the different figures represent like parts. Numeral 9, represents a frame or base plate, preferably of metal, which may be attached to the top of any work bench by adjustable means such as bolts or lag screws through holes 8 in the plate. Extended forwardly from the side edges of the plate are a pair of arms 10, spaced apart and normally parallel with each other, and have or carry at the tips knobs or fingers 11 for compressing a tire tube or the extended portions thereof against the sides of a mandrel. These knobs assuring a binding effect against the tubes in all cases including folds or uneven surfaces thereof.

Slidably mounted over and across the plate is a bar 12, for supporting the mandrel 13 of convex form, over which any tube indicated as "A" is draped for convenience in making repairs thereon. Where relatively heavy work is to be performed or pounding to be done on the tube, the bar is preferably of rigid metal or other suitable material for withstanding the blows. The mandrel is preferably connected over the outer end of the bar by a pivot 14, to provide any necessary lateral adjustments of the mandrel to facilitate the even bearing of the fingers on tubes wherein ribs or folds may be found along the edges thereof or uneven parallel thicknesses therein. Adjacent to the front of the plate a latch or guard 15 is affixed, beneath which the body of the bar is slidably disposed, and adjacent to the rear of the plate a pair of posts 16 are provided and spaced apart for lateral guards for the rear end of the bar. In order to normally maintain the rear portion of the bar adjacent to the top of the plate, and the front end of the bar in normal upraised position, a pair of coil springs 17 are disposed around the posts and a foot plate 18 is slidably disposed over the posts beneath the springs and across the top of the bar. Washers 19, and cotter pins 19' maintain the springs with suitable tension against the bar on the rear portion thereof.

In dimensions the width of the mandrel across the lower edges thereof is considerably greater than the space between the arms and fingers, and the bar is bent upward and outward at 12' whereby the sides of the mandrel are normally upraised and bear against the fingers on each side thereof and against any tube thereon in resilient relation according to the tension of the springs 17. In operation, when a tube is to be disposed in position for repairs over the mandrel, the operator manually depresses the mandrel against the tension of the springs whereby the bar is tipped downward beyond the plate or forwardly therefrom sufficiently to permit the withdrawal forwardly of the mandrel from the fingers, and thereupon the tube is suitably disposed over the mandrel, which is again manually depressed and pushed back below and between the fingers and then released, and automatically the mandrel and tube thereon are upraised by pressure of the springs, between the fingers, whereby the sides of the tube are wiped downward, smoothed and maintained in suitable position for necessary work on the tube, by the fingers.

To facilitate the longitudinal movements of the bar, a roller 21 is freely disposed on a pintle 22 between ears 23 below the plate, in position for the top of the roller to extend slightly above the plate whereon the bar is supported for easy travel for changing positions of the mandrel. The forward travel of the bar is limited by a pin 24 projected above the rear end of the bar, for contacting with the foot member 18.

In cases where little stress is to be applied upon the tube and mandrel it is sometimes preferable to adapt slight changes in the construction and operation of the bar. These changes are illustrated in Figs. 5, 6 and 7.

In this alternate structure of the bar, the latter is preferably formed from material with inherent resiliency sufficient to permit the front end to be lowered or bent down for adjustments with the mandrel and fingers, and which will when manually released, automatically elevate the mandrel between the fingers for maintaining a tube in position as before described. In this construction the bar is indicated by numeral 30, having an upturned neck or body 30' for supporting the mandrel in upraised position between the fingers. The coil springs and posts are eliminated, and a latch guard 31 is affixed to the plate wherein or beneath the same, the rear portion of the bar is slidably disposed, being limited in forward travel by a like pin 24.

In operating with this bar, the manual operations are similar to those with the rigid bar, only in this case the bar itself bends. As indicated in Fig. 6 the mandrel is extended forwardly for draping the tube thereover, and normally is resiliently upraised between the fingers as indicated by dotted lines, for binding the tube against the sides of the mandrel by the fingers. It will be understood, that in order to depress the mandrel, the operator manually presses downward on the mandrel and thereby bends downward the outer portion of the resilient bar outside the plate 9, for removing or replacing the mandrel between the arms, and that on releasing the manual pressure, the resilient arm maintains the mandrel and tube in resilient state between the fingers.

Having described my invention, I claim for Letters Patent:

1. A device for holding tire tubes, comprising, a base plate for connection with a work bench, a bar slidably mounted over and across the plate and extended forwardly therefrom for supporting a mandrel, a convex mandrel pivotally connected on the forward end of the bar for spreading and supporting a tire tube, a pair of arms extended forwardly from the edges of the plate parallel with each other and spaced apart for spanning and overlying the mandrel, fingers on the outer ends of the bars of relatively greater diameter than the bars for bearing against a tube placed on said mandrel and for maintaining the portion of the tube above the fingers in snug relation over the top of the mandrel, said bar and mandrel being resiliently biased toward said arms for binding the mandrel normally with the fingers and causing said fingers to wipe the adjacent portions of the tube downwardly over the sides of the mandrel.

2. A device for holding tire tubes, comprising a base plate, a bar slidably mounted over and across the plate having its outer end resiliently elevated on a higher plane normally than the plate, a convex mandrel pivotally connected to said outer end portion of the bar for adjustably supporting a tire tube, a pair of parallel arms extended forwardly from the plate for spanning and overlying the mandrel, a freely turning roller mounted beneath the plate having its upper face above the top of the plate and beneath the bar to facilitate adjusting and tube mounting movement of the bar, the said arms extending over the side portions of the mandrel for wiping the sides of the tube downward and maintaining it stressed over the top of the mandrel as said mandrel is resiliently urged toward said arms.

3. Structure described in the foregoing claim 2, wherein the resilient elevation of the bar is inherent in the bar.

4. Structure described in claim 2, wherein the resilient elevation of the bar is accomplished with helical springs mounted over the rear portion of the bar.

GEORGE M. ANDERSON.

REFERENCES CITED

The following references are of record in the file of this patent:

UNITED STATES PATENTS

| Number | Name | Date |
|---|---|---|
| 1,867,248 | Brotherman et al. | July 12, 1932 |
| 2,057,973 | Plank | Oct. 20, 1936 |

FOREIGN PATENTS

| Number | Country | Date |
|---|---|---|
| 578,179 | Germany | June 10, 1933 |